(12) United States Patent
Gallagher et al.

(10) Patent No.: US 10,738,627 B2
(45) Date of Patent: *Aug. 11, 2020

(54) GEARED LOW FAN PRESSURE RATIO FAN EXIT GUIDE VANE STAGGER ANGLE

(71) Applicant: United Technologies Corporation, Farmington, CT (US)

(72) Inventors: Edward J. Gallagher, West Hartford, CT (US); Glen E. Potter, Vernon, CT (US); Barry M. Ford, Middletown, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 238 days.

This patent is subject to a terminal disclaimer.

(21) Appl. No.: 15/871,248

(22) Filed: Jan. 15, 2018

(65) Prior Publication Data

US 2018/0156048 A1 Jun. 7, 2018

Related U.S. Application Data

(63) Continuation of application No. 14/433,700, filed as application No. PCT/US2013/036891 on Apr. 17, 2013, now Pat. No. 9,869,191.

(Continued)

(51) Int. Cl.
| | | |
|---|---|---|
| *F01D 9/04* | (2006.01) | |
| *F01D 1/02* | (2006.01) | |
| *F01D 5/02* | (2006.01) | |
| *F01D 25/24* | (2006.01) | |
| *F02K 3/06* | (2006.01) | |

(Continued)

(52) U.S. Cl.
CPC ............... *F01D 9/04* (2013.01); *F01D 1/023* (2013.01); *F01D 5/021* (2013.01); *F01D 25/24* (2013.01);
(Continued)

(58) Field of Classification Search
CPC . F01D 9/04; F01D 1/023; F01D 5/021; F01D 5/141; F01D 25/24; F01D 9/041;
(Continued)

(56) References Cited

U.S. PATENT DOCUMENTS

| | | |
|---|---|---|
| 5,246,339 A | 9/1993 | Bengtsson et al. |
| 5,342,170 A | 8/1994 | Elvekjaer et al. |

(Continued)

OTHER PUBLICATIONS

United States Patent Application entitled "Pylon Matched Fan Exit Guide Vane for Noise Reduction in a Geared Turbofan Engine".

(Continued)

*Primary Examiner* — Kenneth J Hansen
*Assistant Examiner* — Eric J Zamora Alvarez
(74) *Attorney, Agent, or Firm* — Carlson, Gaskey & Olds, P.C.

(57) ABSTRACT

A fan exit guide vane assembly for a gas turbine engine includes a plurality of guide vanes having a pressure side and a suction side extending between a leading edge and a trailing edge. The vanes further include a span extending between a root and tip with a stagger angle defined as an angle between a longitudinal axis parallel to an engine axis of rotation and a line connecting the leading edge and the trailing edge that is less than about 15°.

19 Claims, 3 Drawing Sheets

Related U.S. Application Data

(60) Provisional application No. 61/711,264, filed on Oct. 9, 2012.

(51) Int. Cl.
    *F02C 3/107* (2006.01)
    *F01D 5/14* (2006.01)

(52) U.S. Cl.
    CPC .............. *F02C 3/107* (2013.01); *F02K 3/06* (2013.01); *F01D 5/141* (2013.01); *F05D 2220/32* (2013.01); *F05D 2220/36* (2013.01); *F05D 2230/60* (2013.01); *F05D 2240/12* (2013.01); *Y10T 29/49323* (2015.01)

(58) Field of Classification Search
    CPC ........... F05D 2240/121; F05D 2220/32; F05D 2220/36; F05D 2230/60; F05D 2240/12; F02C 3/107; F02K 3/06; Y10T 29/49323
    See application file for complete search history.

(56) References Cited

U.S. PATENT DOCUMENTS

| | | |
|---|---|---|
| 5,345,760 A | 9/1994 | Giffin, III |
| 5,470,200 A | 11/1995 | Tupov et al. |
| 6,041,589 A | 3/2000 | Giffin, III et al. |
| 6,195,983 B1 | 3/2001 | Wadia et al. |
| 6,331,100 B1 | 12/2001 | Liu et al. |
| 6,619,030 B1 | 9/2003 | Seda et al. |
| 6,905,307 B2 | 6/2005 | Kawarada et al. |
| 7,334,998 B2 | 2/2008 | Jones et al. |
| 7,444,802 B2 | 11/2008 | Parry |
| 7,607,287 B2 | 10/2009 | Reba et al. |
| 8,082,726 B2 | 12/2011 | Cloft |
| 8,333,559 B2 | 12/2012 | Bushnell |
| 2004/0258520 A1 | 12/2004 | Parry |
| 2008/0072569 A1 | 3/2008 | Moniz et al. |
| 2008/0226454 A1* | 9/2008 | Decker ................. F04D 29/384 416/203 |
| 2009/0097967 A1* | 4/2009 | Smith ................... F01D 17/162 415/145 |
| 2010/0119366 A1 | 5/2010 | Bushnell |
| 2011/0081252 A1 | 4/2011 | Li |

OTHER PUBLICATIONS

International Search Report and Written Opinion for International Application No. PCT/US2013/036891 dated Feb. 7, 2014.
International Preliminary Report on Patentability for International Application No. PCT/US2013/036891 dated Apr. 23, 2015.

* cited by examiner

GEARED LOW FAN PRESSURE RATIO FAN EXIT GUIDE VANE STAGGER ANGLE

CROSS REFERENCE TO RELATED APPLICATION

This application is a continuation of U.S. application Ser. No. 14/433,700 filed on Apr. 6, 2015, which is United States National Phase of PCT Application No. PCT/US2013/036891 filed on Apr. 17, 2013, which claims priority to U.S. Provisional Application No. 61/711,264 filed on Oct. 9, 2012.

STATEMENT REGARDING FEDERALLY SPONSORED RESEARCH OR DEVELOPMENT

This disclosure was made with Government support under NAS3-01138 awarded by the National Aeronautics and Space Administration. The Government has certain rights in this disclosure.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The fan section may also be driven by the low inner shaft. A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds.

The fan section drives air through a bypass duct and induces a swirl within bypass airflow that is diffused by exit guide vanes. The exit guide vanes turn bypass flow through the bypass duct toward an axial direction. Each of the guide vanes includes a stagger angle that provides the desired turning or diffusion of airflow toward the axial direction.

Although geared architectures have improved propulsive efficiency, turbine engine manufacturers continue to seek further improvements to engine performance including improvements to thermal, transfer and propulsive efficiencies.

SUMMARY

A gas turbine according to an exemplary embodiment of this disclosure, among other possible things includes a turbine driven fan rotor including a plurality of fan blades rotatable about an axis, a core engine including a turbine section that drives the fan, a duct circumscribing the fan rotor and defining a passageway aft of the fan rotor about the core engine, and a fan exit guide vane assembly including a plurality of exit guide vanes positioned downstream of the fan rotor within the duct. Each of the plurality of exit guide vanes includes a stagger angle of less than about 15° at a midspan portion relative to a line parallel to the axis.

In a further embodiment of the foregoing gas turbine engine, the stagger angle is less than about 12° at the midspan portion.

In a further embodiment of any of the foregoing gas turbine engines, the stagger angle is between about 8° and 12° at the midspan portion.

In a further embodiment of any of the foregoing gas turbine engines, the midspan portion is between about 40% and about 85% of a total span of the vane.

In a further embodiment of any of the foregoing gas turbine engines, a difference between a maximum stagger angle and a minimum stagger angle for each of the plurality of exit guide vanes is less than about 6°.

In a further embodiment of any of the foregoing gas turbine engines, the duct defines a bypass with a bypass ratio being defined as the portion of air delivered into the bypass duct divided by the amount of air delivered into the core engine, with the bypass ratio being greater than about 6.0.

In a further embodiment of any of the foregoing gas turbine engines, the bypass ratio is greater than about 10.0.

In a further embodiment of any of the foregoing gas turbine engines, a fan pressure ratio across the fan is less than about 1.5.

In a further embodiment of any of the foregoing gas turbine engines, each of the plurality of guide vanes are support at least a portion of the core engine.

In a further embodiment of any of the foregoing gas turbine engines, includes a geared architecture driven by the turbine section for rotating the fan about the axis.

A fan exit guide vane assembly for a gas turbine engine according to an exemplary embodiment of this disclosure, among other possible things includes a plurality of guide vanes including a pressure side and a suction side extending between a leading edge and a trailing edge and a span extending between a root and tip. A stagger angle is defined as an angle between a longitudinal axis parallel to an engine axis of rotation and a line connecting the leading edge and the trailing edge is less than about 15° at a midspan portion.

In a further embodiment of the foregoing fan exit guide vane assembly, the stagger angle varies along the span from the root to the tip with a difference between a maximum stagger angle and a minimum stagger angle along the span is less than about 6°.

In a further embodiment of any of the foregoing fan exit guide vane assemblies, the stagger angle varies along the span between the root and the tip for a specific percent of the span according to the values set out in Table 1.

In a further embodiment of any of the foregoing fan exit guide vane assemblies, the stagger angle is less than about 12° at a midspan portion.

In a further embodiment of any of the foregoing fan exit guide vane assemblies, the midspan portion includes that portion of the span between about 40% and about 85% of a total span of the vane.

A method of assembling a fan exit guide vane assembly according to an exemplary embodiment of this disclosure, among other possible things includes forming a plurality of guide vanes to include a pressure side and a suction side extending between a leading edge and a trailing edge and a span extending between a root and tip. A stagger angle is defined as an angle between a longitudinal axis parallel to an engine axis of rotation and a line connecting the leading edge and the trailing edge is less than about 15° at a midspan portion, and arranging the plurality of guide vanes for assembly within a bypass duct.

In a further embodiment of the foregoing method, includes forming each of the plurality of guide vanes to include a stagger angle between about 8° and 12° at the midspan portion.

In a further embodiment of any of the foregoing methods, includes forming each of the plurality of guide vanes to include a varying stagger angle between the root and the tip with a difference between a maximum stagger angle and a minimum stagger angle for each of the plurality of guide vanes is less than about 6°.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DESCRIPTION

Figure 1:
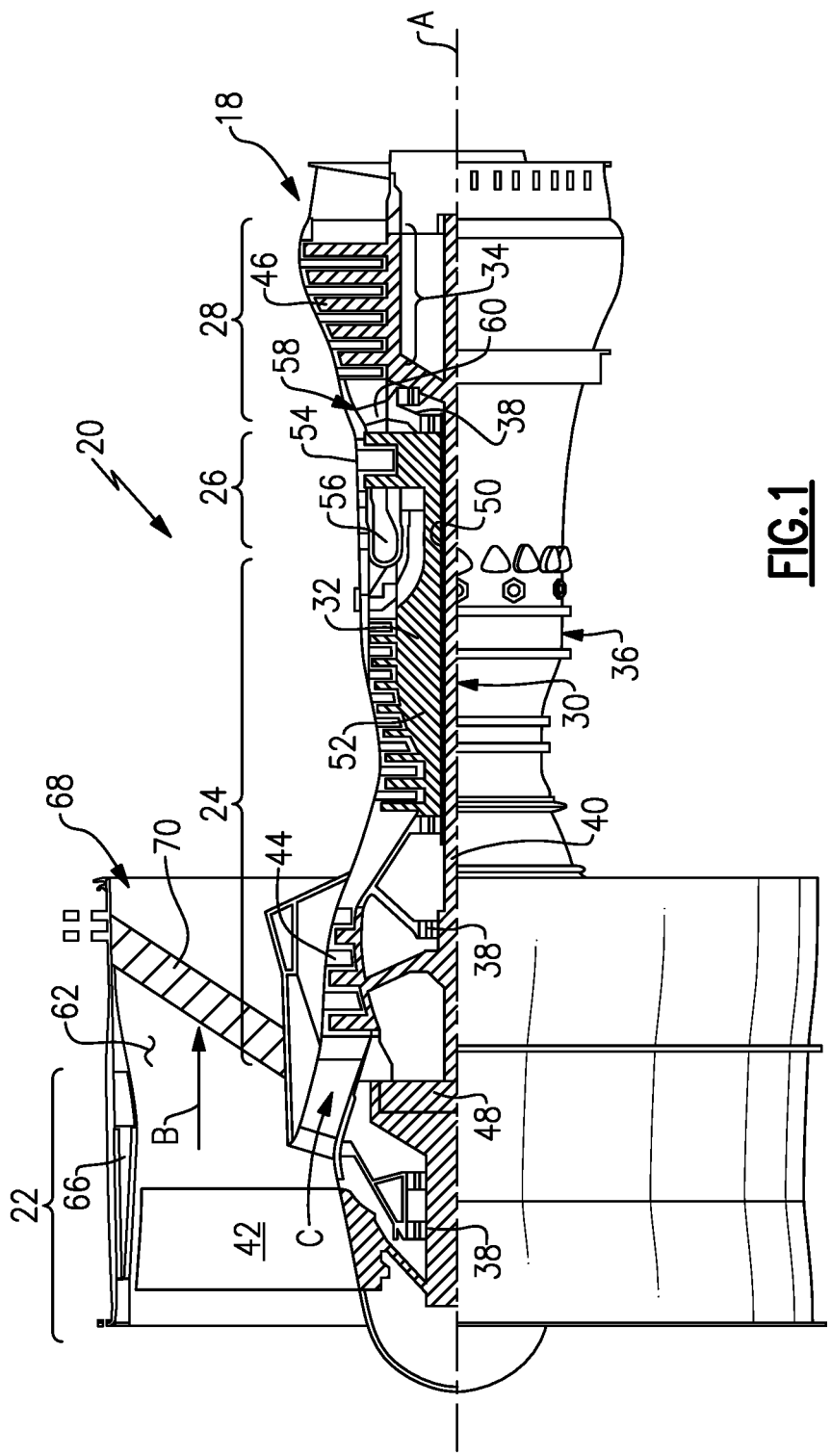
FIG. 1 is a schematic view of an example gas turbine engine.

FIG. 1 schematically illustrates an example gas turbine engine 20 that includes a fan section 22, and a core engine section 18 including a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core flow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition— typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(T_{ram} \ °R)/(518.7° R)]^{0.5}$. The "Low corrected fan tip speed", as disclosed herein according to one non-limiting embodiment, is less than about 1150 ft/second.

The example gas turbine engine includes the fan section 22 that comprises in one non-limiting embodiment less than about twenty-six (26) fan blades 42. In another non-limiting embodiment, the fan section 22 includes less than about twenty (20) fan blades 42. Moreover, in one disclosed embodiment the low pressure turbine 46 includes no more than about six (6) turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
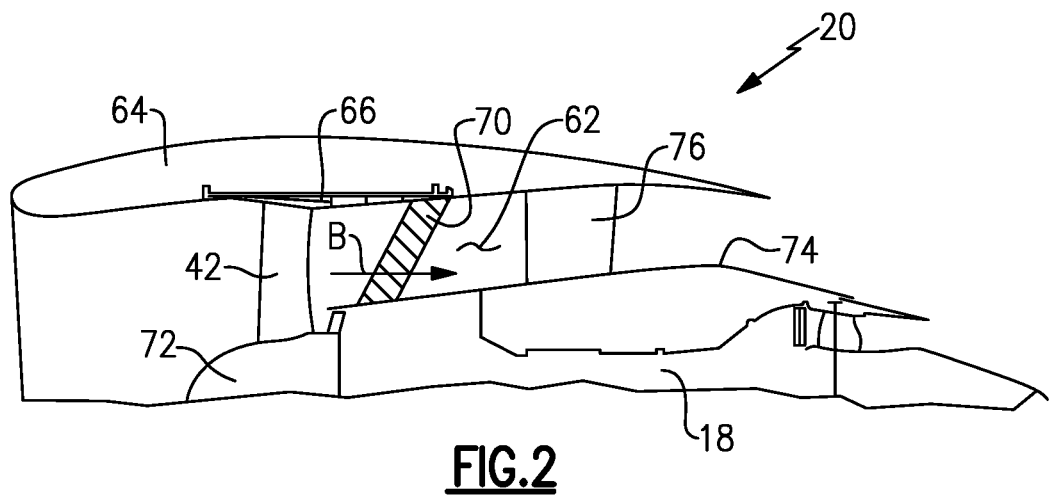
FIG. 2 is a schematic view of the example gas turbine engine and bypass duct.
Figure 3:
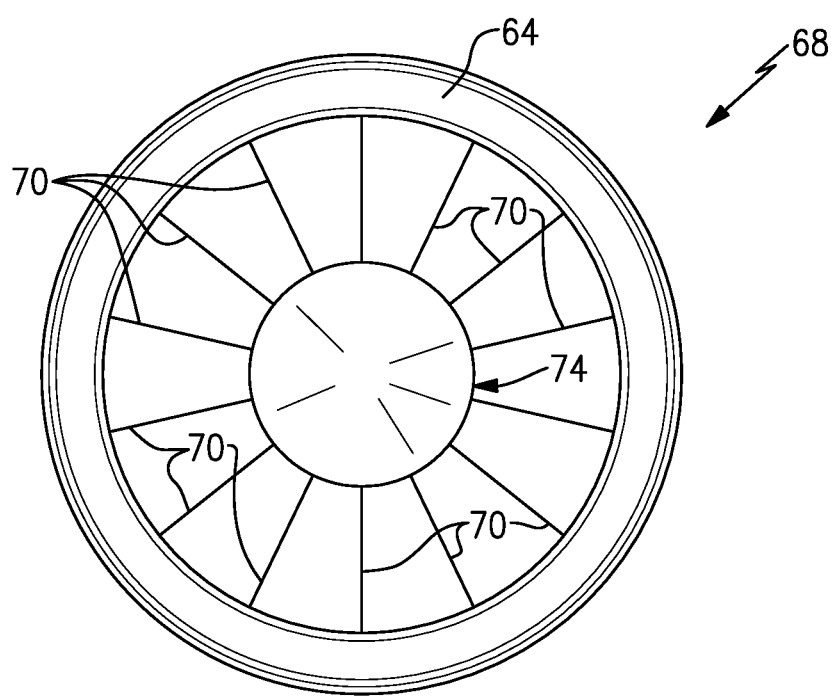
FIG. 3 is a forward view aft into the example bypass duct.
Figure 4:
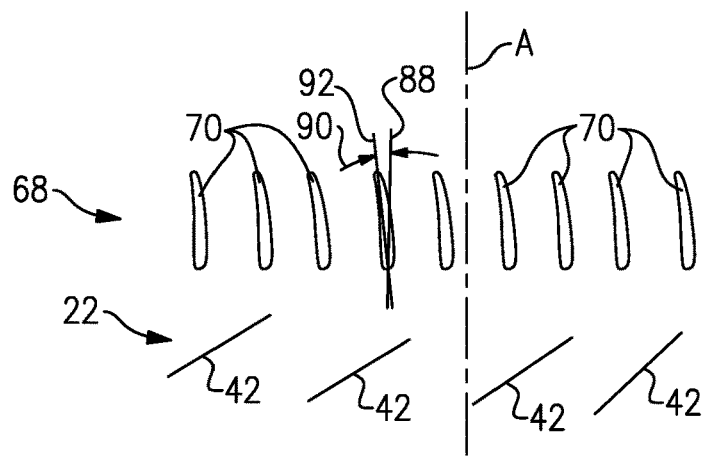
FIG. 4 is a schematic view of an example exit guide vane assembly.

Referring to FIGS. 2, 3 and 4 with continued reference to FIG. 1, a principle of gas turbine engines is that a higher propulsive efficiency is enabled as exit jet velocity decreases while the bypass ratio increases. In this circumstance, the amount of air passing through the core flow stream that includes the compressor and turbine is exceeded by the amount that bypasses it through a surrounding annular bypass duct 62. As this bypass air flow B increases and a lower jet velocity is pursued, the optimal duct fan pressure ratio (FPR) tends to be lower.

Pressure in the bypass duct 62 is generated by the fan blades 42. The resulting swirled duct airflow is turned back toward the engine axial direction by a stationary blade row, or fan exit guide vane (FEGV) assembly 68. Because of the presence of a sizeable pylon 76 (shown in FIG. 2) in the downstream duct the FEGV assembly 68 is comprised of a number of circumferentially offset, differently cambered vanes 70, including a generally "nominal" class vane, that is, the most numerous class vane in the row.

The benefit of increased bypass flow is fully realized and enabled, and the overall engine performance significantly improved, only so long as the component efficiency for the fan section 22 and the FEGV assembly 68 function properly. Achieving a desired bypass flow B, pressure ratio and efficiency is directly related to the proper design of the fan section 22 and the FEGV geometry.

In the pursuit of a highly efficient low pressure ratio fan stage, it is important to understand that performance debits fall into two main categories: shock losses and frictional losses. In the case of the fan blades 42, the dominant loss source has historically been shock losses associated due to the high rate of rotational speed that is typical of direct drive engine configurations. The geared architecture 48 enables a differentiation of design point rotational speed between the fan section 22 and the fan drive or low pressure turbine 46 in this example. The geared architecture 48 enables lower fan blade shock losses and therefore also requires different fan blade 22 and FEGV 70 designs in order to realize the performance benefits. Reductions in the level of flow swirl emitted by the gear drive fan section 22 enable the nominal FEGV 70 to have a simplified configuration.

The example FEGV assembly 68 includes a plurality of circumferentially offset FEGVs 70 disposed aft, that is, downstream of the fan blades 42 within the bypass duct 62, illustrated schematically in FIG. 4. The bypass duct 62 is an annular duct bounded on a radially outward side by an outer nacelle 64 and fan case 66 and on a radially inner side by a core nacelle 74. The FEGVs 70 are arranged within the bypass duct 62 and extend radially outward from the core nacelle 74. In this example, the FEGVs 70 are a structural feature that supports the core engine 18 within the fan case 66. Each of the FEGVs 70 includes a slightly different geometry to direct bypass airflow B around obstructions in the bypass duct 62 such as a mounting pylon 76. However, the plurality of FEGVs 70 have a similar nominal airfoil shape.

Figure 5:
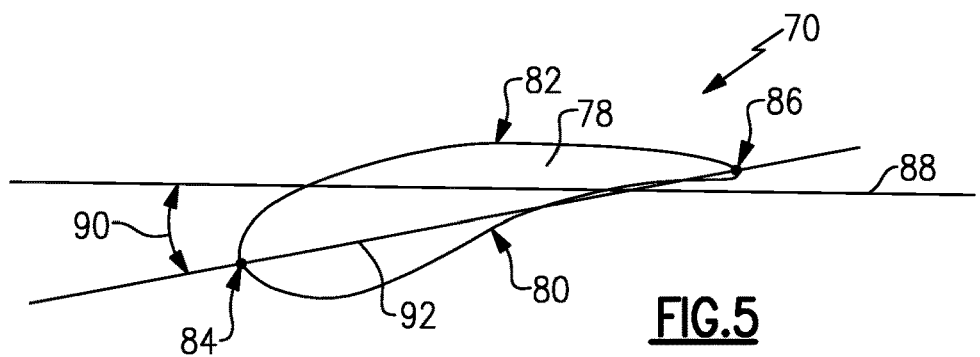
FIG. 5 is cross-section through the exit guide vane.
Figure 6:
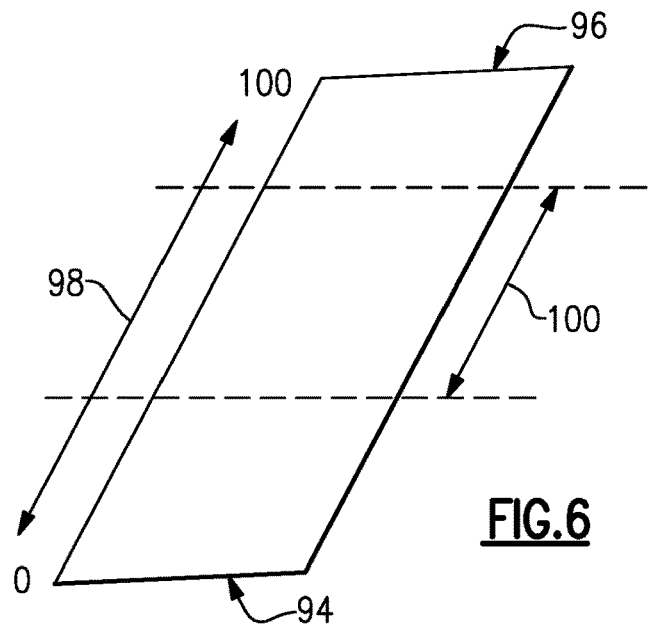
FIG. 6 is a side view of an example exit guide vane.

Referring to FIGS. 5 and 6 with continued reference to FIG. 2, each of the FEGVs 70 comprise an airfoil shape including a pressure side 80, and a suction side 82 that meet at a leading edge 84 and trailing edge 86. The FEGV 70 further includes a root portion 94 that is disposed at the radially inner surface of the duct 62 and a tip 96 disposed at the radially outer surface of the duct 62. The airfoil includes a span 98, extending in the radial direction for the fan, that extends between the root 94 and the tip 96. A stagger angle 90 is the angle between a line 88 parallel with the engine longitudinal axis and a line 92 connecting the leading edge 84 and the trailing edge 86. The example FEGV 70 includes a twist that results in differing stagger angles at different locations along the span 98.

Table 1 below lists one example series of stagger angles 90 as a function of a position along the span 98 that provides a nominal FEGV 70 for the an exemplary geared fan stage within a range of about +/−0.5 degrees.

TABLE 1

Geared Fan Stage FEGV Stagger Angle
Nominal FEGV

| PCT-AVG | STAGGER (°) |
|---|---|
| 0.0 | 13.4 |
| 9.4 | 12.6 |
| 17.6 | 12.0 |
| 24.9 | 11.6 |
| 31.5 | 11.2 |
| 37.5 | 11.0 |
| 43.0 | 10.7 |
| 48.1 | 10.6 |
| 52.9 | 10.4 |
| 57.5 | 10.3 |
| 61.8 | 10.2 |
| 66.0 | 10.2 |
| 70.1 | 10.2 |
| 74.0 | 10.2 |
| 77.8 | 10.3 |
| 81.5 | 10.5 |

TABLE 1-continued

Geared Fan Stage FEGV Stagger Angle
Nominal FEGV

| PCT-AVG | STAGGER (°) |
|---------|-------------|
| 65.1    | 10.7        |
| 88.8    | 11.1        |
| 92.4    | 11.8        |
| 96.1    | 12.9        |
| 100.0   | 15.3        |

Table 1 above discloses one specific example embodiment of the FEGV assembly 68. However, the functions of the FEGVs 70 are enabled by including a plurality of nominal FEGVs 70 that include a stagger angle of less than about 15° within the midspan portion 100 relative to the line 88. In another example embodiment, the stagger angle 90 is between about 8° and 12° at the midspan portion 100. In this example the midspan portion is between about 40% and about 85% of total span 98 of the FEGV 70.

The FEGVs 70 are further defined to include small differences in the stagger angle 90 along the span 98. In this example, a difference between a maximum stagger angle along the entire span 98 and a minimum stagger angle along the span 98 for each of the FEGVs 70 is less than about 6°. The small differences in stagger angle 90 along the span 98 for any one FEGV 70 simplifies manufacture and assembly while also providing the desired functional bypass flow diverting performance.

Accordingly, the disclosed FEGV assembly 68 provides vanes with a decreased and more axially oriented, stagger angle that enable the required function and high efficiency to completely realize the benefits of the geared architecture 48.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gas turbine engine comprising:
a turbine driven fan rotor including a plurality of fan blades rotatable about an axis;
a core engine including a turbine section that drives the fan rotor;
a duct circumscribing the fan rotor and defining a passageway aft of the fan rotor about the core engine; and
a fan exit guide vane assembly including a plurality of fan exit guide vanes positioned downstream of the fan rotor within the duct, wherein each of the plurality of fan exit guide vanes includes a stagger angle that varies along a span between a root and tip as shown by percent average span location values set out in Table 1.

2. The gas turbine engine as recited in claim 1, wherein the stagger angle is less than 15° at a midspan portion relative to a line parallel to the axis.

3. The gas turbine engine as recited in claim 1, wherein the stagger angle is less than 12° at a midspan portion.

4. The gas turbine engine as recited in claim 1, wherein the stagger angle is between 8° and 12° at a midspan portion.

5. The gas turbine engine as recited in claim 4, wherein the midspan portion is between 40% and 85% of a total span for each of the plurality of fan exit guide vanes.

6. The gas turbine engine as recited in claim 1, wherein a difference between a maximum stagger angle and a minimum stagger angle for each of the plurality of fan exit guide vanes is less than 6°.

7. The gas turbine engine as recited in claim 6, wherein the duct defines a bypass duct with a bypass ratio being defined as a portion of air delivered into the bypass duct divided by an amount of air delivered into the core engine, with the bypass ratio being greater than 6.0.

8. The gas turbine engine as recited in claim 6, wherein the bypass ratio is greater than 10.0.

9. The gas turbine engine as recited in claim 8, wherein a fan pressure ratio across the fan rotor is less than 1.5.

10. The gas turbine engine as recited in claim 9, wherein each of the plurality of fan exit guide vanes support at least a portion of the core engine.

11. The gas turbine engine as recited in claim 10, wherein the duct defines a bypass duct with a bypass ratio being defined as a portion of air delivered into the bypass duct divided by an amount of air delivered into the core engine, with the bypass ratio being greater than 6.0.

12. A gas turbine engine assembly comprising:
a turbine driven fan rotor including a plurality of fan blades rotatable about an axis;
a core engine including a turbine section that drives the fan rotor;
a duct circumscribing the fan rotor and defining a passageway aft of the fan rotor about the core engine; and
a fan exit guide vane assembly including a plurality of guide vanes including a pressure side and a suction side extending between a leading edge and a trailing edge and a span extending between a root and a tip, wherein a stagger angle is defined as an angle between a longitudinal axis parallel to an engine axis of rotation and a line connecting the leading and the trailing edge, the stagger angle varies along the span from the root to the tip with a difference between a maximum stagger angle and a minimum stagger angle along the span that is less than 6° and the stagger angle varies along a span between the root and the tip as shown by percent average span location values set out in Table 1.

13. The gas turbine engine assembly as recited in claim 12, wherein the stagger angle is less than 15° at a midspan portion.

14. The gas turbine engine assembly as recited in claim 12, wherein the stagger angle is less than 12° at a midspan portion.

15. The gas turbine engine assembly as recited in claim 14, wherein the midspan portion includes a portion of the span between 40% and 85% of a total span for each of the plurality of guide vanes.

16. The gas turbine engine assembly as recited in claim 15, wherein the duct defines a bypass duct with a bypass ratio being defined as a portion of air delivered into the bypass duct divided by an amount of air delivered into the core engine, with the bypass ratio being greater than 6.0.

17. The gas turbine engine as recited in claim 16, including a geared architecture driven by the turbine section for driving the fan rotor about the axis.

18. The gas turbine engine as recited in claim 17, wherein the turbine section includes a low pressure turbine that drives the geared architecture, the low pressure turbine including no more than six turbine rotors.

19. The gas turbine engine as recited in claim 18, wherein a ratio between a number of the plurality of fan blades and a number of turbine rotors is between 3.3 and 8.6.

* * * * *